United States Patent Office 3,661,975
Patented May 9, 1972

3,661,975
N-ACETYL-N-(2,4,6-TRIIODO-3-AMINOPHENYL)-β-AMINO-ISOBUTYRIC ACID
Johannes A. Korver, 7 Albertine Agneslaan,
Naarden, Netherlands
No Drawing. Continuation-in-part of application Ser. No. 594,193, Nov. 14, 1966. This application July 31, 1967, Ser. No. 657,036
Claims priority, application Netherlands, Nov. 25, 1965, 6515305; May 26, 1966, 6607275
Int. Cl. C07c 103/32
U.S. Cl. 260—471 A                    8 Claims

ABSTRACT OF THE DISCLOSURE

N-acetyl-N-(2,4,6-triiodo-3-aminophenyl) - β - aminoisobutyric acid and its physiologically tolerated salts and esters are radiopaque and non-toxic in amounts adequate for cholecystography. They are prepared by reacting metanitraniline with methacrylic acid in a pyridine medium, acetylating the N-3-nitrophenyl-β-amino-isobutyric acid formed, and hydrogenating and iodating the N-acetyl derivative.

BACKGROUND OF THE INVENTION

This application is a continuation-in-part of the copending application Ser. No. 594,193, filed Nov. 14, 1966 now abandoned.

This invention relates to radiopaque materials, and particularly to iodine bearing organic substances suitable for cholecystography.

Many organic materials containing a large percentage of iodine are radiopaque but only few combine adequate radiopacity with low toxicity. Among the iodine bearing compounds which are least toxic, iopanoic acid and the ipodates of sodium and calcium are commonly used in cholecystography. While the toxicity of these compounds is relatively low, it is not negligible.

The object of the invention is the provision of radiopaque materials which are at least as effective as the aforementioned known materials when employed at the same dosage rate while being less toxic.

SUMMARY OF THE INVENTION

We have found that N-acetyl-N-(2,4,6-triiodo-3-aminophenyl)-β-amino-isobutyric acid and its physiologically tolerated salts are significantly less toxic than iopanoic acid or the ipodates while producing excellent cholecystograms.

They are readily prepared in excellent yields in a sequence of steps which starts with the reaction between m-nitraniline and methacrylic acid in a medium containing enough of a base to neutralize the acid, whereby N-3-nitrophenyl-β-aminoisobutyric acid is produced, acetylation of the latter at the amino group, and hydrogenation and iodization of the N-acetylation compound. The salts and esters are prepared from the free acid by conventional methods.

DESCRIPTION OF PREFERRED EMBODIMENTS

The following examples illustrate preferred practice but it will be understood that the invention is not limited thereto.

Example I

A mixture of equimolecular amounts of m-nitraniline (69 g.), methacrylic acid (43 g.), and pyridine (39.5 g.) was heated to 125° C. for twenty hours, and was then poured into 500 ml. water. A semi-crystalline product separated from the liquid. The supernatant liquid was decanted and 500 ml. fresh water was added.

The pH was adjusted to 7–7.5 by means of sodium hydroxide. The precipitate was filtered with suction and washed with water. When the filtrate was acidified with acetic acid, a precipitate of N-(3-nitrophenyl)-β-aminoisobutyric acid was formed. When filtered, washed with water and dried, it weighed 56 g. and had a melting point of 124–126° C. which, after recrystallization from alcohol, rose to 130–131° C. The yield was 50% based on nitraniline.

The precipitate obtained after adjusting the pH to 7–7.5 was stirred with 200 ml. N hydrochloric acid at 60° C. The non-soluble part was filtered, washed with water and dried. It weighed 5 g., had a melting point of 156° C. after recrystallization from alcohol, and consists of N-(3-nitrophenyl) - β - amino isobutyr-(3-nitroanilide). The filtrate was neutralized with sodium hydroxide to precipitate 25 g. unreacted m-nitraniline, which was recovered by filtration.

0.25 mol (0.56 g.) N - (3-nitrophenyl)-β-aminoisobutyric acid, prepared as described above, 160 ml. glacial acetic acid, and 40 ml. acetic anhydride were heated 48 hours to 50° C., and the reaction mixture was poured into 600 ml. water. A crystalline precipitate of N-acetyl-N-(3-nitrophenyl)-β-aminoisobutyric acid formed gradually. When recovered, it weighed 56 g. (84% yield). M.P. 146°–148° C.

100 g. N-acetyl-N-(3-nitrophenyl)-β-aminoisobutyric acid were dissolved in one liter water and 40 ml. 25% aqueous ammonia, and the solution was hydrogenated in the presence of about 10 g. Raney nickel at 20° C. and about 450 p.s.i. until the pressure drop indicated the complete conversion of the $NO_2$ groups to $NH_2$.

The solution of N-acetyl-N-(3-aminophenyl)-β-aminoisobutyric acid was filtered after standing overnight, mixed with an equal volume of acetic acid, and thereafter with a solution of 275 g. iodine monochloride and 200 g. sodium chloride in one liter water. The mixture was kept at 50° C. with stirring for 48 hours.

Light brown crystals of crude N-acetyl-N-(2,4,6-triiodo-3-aminophenyl) - β - amino - isobutyric acid precipitated, were filtered off, washed with water, and dried. They weighed 195 g. (84.5% yield based on N-acetyl-N-3-nitrophenyl-β-aminoisobutyric acid).

The crude material was dissolved in a mixture of 25 ml. 25% ammonia and 400 ml. 96% ethanol, the solution was filtered over active carbon, and the filtrate was acidified with 25 ml. acetic acid. The crystalline precipitate which formed after some time was again dissolved in a mixture of aqueous ammonia and alcohol, and reprecipitated with acetic acid.

The purified product had a melting point of 227°–228° C., and weighed 90 g. (39% yield, based on the N-acetyl-N-3-nitrophenyl-β-aminoisobutyric acid).

The combined mother liquors and washings were diluted with water to an alcohol content of 70%, filtered over active carbon, and further diluted to about 50% ethanol. A pure compound melting at 189°–190° C. crystallized (83 g., 36% yield, based on the N-acetyl-N-3-nitrophenyl-β-aminoisobutyric acid).

The two compounds obtained are diasteroisomers. N-acetyl - N - (2,4,6 - triiodo - 3 - aminophenyl)-β-aminoisobutyric acid has the formula

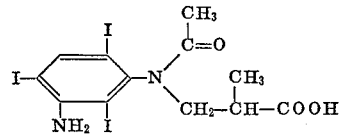

It has an asymmetric carbon atom, and the hindered rotation of the phenyl radical causes additional isomerism.

The diastereoisomerism disappears when the amino radical in the phenyl group is removed, as will be shown hereinafter.

The two compounds formed as described above appear to be racemic mixtures, one being a mixture of the D'D form with the L'L form, and the other one a mixture of the D'L and L'D forms. For the sake of convenience, the higher melting isomer mixture will be referred to hereinafter as Isomer A, the other one as Isomer B. The isomers differ not only in their melting points, but also in their NMR-spectra, their solubilities, and their toxicities. No differences have been detected in the IR and UV spectra. Neither isomer shows optical activity. The solubilities of the isomers in representative solvents at 20° C. in grams per 100 milliliters are listed in Table 1.

TABLE 1

| Solvent | Isomer A | Isomer B |
| --- | --- | --- |
| Water | 0.009 | 0.023 |
| Methanol | 1.03 | 3.50 |
| Ethanol | 1.37 | 2.52 |
| Propanol | 1.08 | 2.50 |
| Butanol | 1.32 | 2.02 |
| Acetone | 0.83 | 2.06 |
| Ethyl acetate | 0.26 | 0.65 |
| Chloroform | 0.46 | 1.82 |
| Diethyl ether | 0.07 | 0.18 |
| Benzene | 0.03 | 0.08 |
| Glacial acetic acid | 1.64 | 3.12 |

The pH values of saturated aqueous solutions of Isomers A and B are respectively 4.13 and 3.92, and the pK values derived therefrom are 4.10 and 4.25, showing but little difference.

The toxicities of the two isomers are different, but substantially lower than those of the aforementioned common radiopaque compounds as is evident from Table 2 which lists values of $LD_{50}$ in grams per kilogram, as determined on rats to whom the several compounds were administered orally and intravenously in aqueous solutions. The values for the toxicity of the isomers A and B and of ipanoic acid were calculated from the results of experiments performed with the corresponding, more soluble methyl glucamine salts.

TABLE 2

| | $LD_{50}$, g./kg. | |
| --- | --- | --- |
| Compound | Oral | Intravenous |
| Isomer A | 1.95 | 0.77 |
| Isomer B | 2.47 | 0.96 |
| Iopanoic acid | 1.54 | 0.28 |
| Calcium ipodate | 1.03 | 0.30 |

Good cholecystograms are obtained with both isomers and their mixtures at the usual dosage of three grams for an adult, applied orally in the usual manner.

Example II

The esters are prepared from the free N-acetyl-N-(2,4,6-triiodo - 3 - aminophenyl)-β-amino-isobutyric acid in a conventional manner. When 30.7 g. (0.05 mol) of isomer-A or B were dispersed in 250 ml. absolute ethanol and refluxed with 1 ml. sulfuric acid for five hours, the acid dissolved, and the ethyl ester was formed. It was recovered by evaporating most of the ethanol, pouring the residue into water, extracting the aqueous mixture four times with 500 ml. ether, drying the combined ether extracts, evaporating the ether to a total volume of 250 ml., and adding an equal volume of petroleum ether. The crystalline ester weighed 26 grams. The melting points of these and other lower alkyl esters prepared in the same manner are listed below.

| | Isomer A, ° C. | Isomer B, ° C. |
| --- | --- | --- |
| Methyl ester | 141–142 | 147–148 |
| Ethyl ester | 102–103 | 131–132 |
| Propyl ester | 76–77 | 127–129 |

Example III

In each of two separate experiments, 2.5 g. of the isomers were respectively dissolved in 25 ml. concentrated sulfuric acid, the solution was cooled to less than 5° C., and 1.25 g. solid sodium nitrite were added in small batches over a period of about ten minutes. The temperature of the mixture was held at not more than 10° C. for two hours while it was stirred.

The solution of the diazonium compound so produced was poured over 100 g. ice, and the aqueous mixture was added to a suspension of about one gram cuprous oxide in 100 ml. ethanol. Nitrogen was gradually liberated and a crystalline precipitate formed. It was filtered off after standing overnight, washed with 50% ethanol, and dried.

The crude material obtained from isomer A started sintering at 163.5° C. and melted at 173–174° C. The product from isomer B sintered at 163.2° C. and melted at 168–172° C. A mixture of the two materials melted at 170–171° C. Their iodine contents were 63.6% and 63.5% respectively (calculated: 63.6% I).

In the absence of the 3-amino group, there is only one racemate.

Example IV

The alkali metal and alkaline earth metal salts, as well as other salts of N-acetyl-N-(2,4,6-triiodo-3-aminophenyl)-β-amino-isobutyric acid are formed by reaction of the acid with the bases in a conventional manner. Both isomers and their mixtures may be used.

30.7 (0.05 mol) isomer A were dissolved in 100 ml. water containing an equimolecular amount of sodium hydroxide, and water was evaporated from the resulting solution (pH 8.5–9). When the oily residue was stirred with acetone, the sodium salt crystallized. It was separated from the mother liquor by suction filtration, and dried in a vacuum. The material is miscible with water in all proportions at 20° C., a viscous liquid being formed with even very small amounts of water. The sodium salt of isomer B has the same properties.

The calcium salt was precipitated when a solution of 30.7 g. of the free acid (either isomer) in 300 ml. water and 3 ml. 25% aqueous ammonia was mixed with a solution of 3 g. dry calcium chloride in 100 ml. water. It was recovered by suction filtration and drying.

Example V

Compositions containing the compounds of the invention and conventional carriers are prepared by the usual methods of galenic pharmacy.

250 g. N - acetyl - N-(2,4,6-triiodo-3-aminophenyl)-β-amino-isobutyric and equal parts A and B) were mixed with 150 g. corn starch and a solution of 20 g. polyvinyl pyrrolidone in alcohol. The moist mass was granulated in the usual manner and dried. The granulate was mixed with 25 g. corn starch and 1 g. magnesium stearate, and tableted, each tablet containing 500 mg. of the active ingredient.

Example VI 500 g. agar-agar were dissolved in 15 liters water. The solution was filtered and 20 kg. sugar and 1 kg. 70% sorbitol were added to the filtrate which was then evaporated until a sample readily gelled upon cooling. 12.5 kg. glucose syrup were added to the hot mass which was then cooled to 60° C., whereupon 2 kg. raspberry pulp, 3 liters liquids red raspberry colorant containing 300 g. amaranth, and 1 kg. glucose syrup, 500 g. raspberry essence, and 250 g. powdered citric acid were added. The fruit jelly base so prepared was mixed with 4.5 kg. powdered N - acetyl-N-(2,4,6-triiodo-3-aminophenyl)-β-amino-isobutyric acid.

The mass, which had a temperature of 55° C. and was still adequately fluid, was then poured into molds, each mold containing 750 mg. of the active agent. The gelled pieces were unmolded, dried in flour, dipped in a 70% sugar solution, covered with granulated sugar, and again dried.

Six tablets prepared as described in Example V or four pieces of fruit flavored sweets prepared according to Example VI were given by mouth to adult patients in the usual manner to prepare the same for cholecystography, corresponding to a dosage of about 40 mg./kg. Equivalent amounts of the salts and esters are employed.

Obviously many modifications and variations of the present invention are possible in the light of the above teachings. Pyridine may be replaced by other tertiary amines, including an additional amount of m-nitraniline, in the condensation of the nitraniline with methacrylic acid to N-3-nitrophenyl-β-aminoisobutyric acid in an amount sufficient to neutralize the acid. Pyridine, however, is superior to triethylamine and similar non-cyclic amines in increasing the rate of reaction. Primary and secondary amines are not inert to the reactants and reduce the yield. When the reaction between nitraniline and methacrylic acid is performed in the absence of pyridine or any other added amine, a portion of the nitraniline is consumed to form an anilide.

The temperature of the condensation reaction indicated in Example I, while not critical, should approximately be maintained for best yields. Lower yields result from higher or lower reaction temperatures. The formation of anilides is favored at higher temperatures.

The use of iodine monochloride in approximately 33% acetic acid is necessary in the iodization step if good yields are to be obtained. The iodization does not proceed adequately in a lower concentration of acetic acid, and the iodized product does not crystallize from a higher concentration of acetic acid. Weak acids other than acetic may, of course, be used.

Other process conditions may be varied within limits which will be obvious to those skilled in the art. It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. A radiopaque compound selected from the group consisting of N-acetyl-N-(2,4,6-triiodo-3-aminophenyl)-β-amino-isobutyric acid, the pharmaceutically acceptable lower alkyl esters thereof and the pharmaceutically acceptable salts thereof with inorganic and organic bases.
2. A compound as set forth in claim 1, which is N-acetyl - N - (2,4,6-triiodo-3-amino-phenyl)-β-amino-isobutyric acid.
3. A compound as set forth in claim 1, which is an alkali metal salt of said acid.
4. A compound as set forth in claim 1, which is an alkaline earth metal salt of said acid.
5. A compound as set forth in claim 1, which is a lower alkyl ester of said acid.
6. A compound as set forth in claim 1 in the form of the sodium salt of N-acetyl-N-(2,4,6-triiodo-3-aminophenyl)-β-amino-isobutyric acid.
7. A compound as set forth in claim 1 in the form of the calcium salt of N-acetyl-N-(2,4,6-triiodo-3-aminophenyl)-β-amino-isobutyric acid.
8. A compound as set forth in claim 1 in the form of the methyl-glucamine salt of N-acetyl-N-(2,4,6-triiodo-3-aminophenyl)-β-amino-isobutyric acid.

References Cited

UNITED STATES PATENTS

| 2,813,118 | 11/1957 | Galler | 260—518 A |
| 3,048,626 | 8/1962 | Wallingford | 260—518 A |
| 3,352,904 | 11/1967 | Bicking et al. | 260—518 A |

OTHER REFERENCES

Finar, I. L.: Organic Chemistry (1963), vol. I, pub. by Richard Clay & Co., Great Britain, pp. 72, 202, 564 and 570 relied on.

LORRAINE A. WEINBERGER, Primary Examiner

L. A. THAXTON, Assistant Examiner

U.S. Cl. X.R.

260—501.11; 518 A; 424—5